(12) United States Patent
Yamasaki et al.

(10) Patent No.: US 7,111,471 B2
(45) Date of Patent: Sep. 26, 2006

(54) REFRIGERANT CYCLE APPARATUS

(75) Inventors: Haruhisa Yamasaki, Ora-gun (JP); Shigeya Ishigaki, Ora-gun (JP); Masaji Yamanaka, Tatebayashi (JP); Kazuaki Fujiwara, Ota (JP); Tsunehisa Yumoto, Ashikaga (JP); Kenzo Matsumoto, Ora-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 253 days.

(21) Appl. No.: 10/776,342

(22) Filed: Feb. 12, 2004

(65) Prior Publication Data
US 2004/0216484 A1 Nov. 4, 2004

(30) Foreign Application Priority Data
Mar. 26, 2003 (JP) .............................. 2003-085242

(51) Int. Cl.
F25B 49/02 (2006.01)
(52) U.S. Cl. ........................................ 62/228.4; 62/510
(58) Field of Classification Search ............... 62/228.1, 62/228.3, 228.4, 180, 181, 183, 184, 510, 62/513, 505
See application file for complete search history.

(56) References Cited
U.S. PATENT DOCUMENTS

| 3,719,057 A | * | 3/1973 | Grant ........................... 62/510 |
| 3,759,052 A | * | 9/1973 | Inoue ........................... 62/510 |
| 4,787,211 A |   | 11/1988 | Shaw ........................... 62/117 |
| 4,947,655 A | * | 8/1990 | Shaw ........................... 62/505 |
| 5,094,085 A |   | 3/1992 | Irino ........................... 62/175 |
| 6,698,234 B1 | * | 3/2004 | Gopalnarayanan et al. ... 62/513 |

FOREIGN PATENT DOCUMENTS

| DE | 37 16393 A1 | 11/1987 |
| EP | 1 067 341 A2 | 1/2002 |
| EP | 1 067 341 A3 | 7/2002 |
| EP | 1 273 468 A1 | 1/2003 |
| JP | 7-18602 | 3/1995 |
| WO | WO 03/019085 | 3/2003 |

OTHER PUBLICATIONS

Communication—European Search Report dated Jul. 29, 2004.

* cited by examiner

*Primary Examiner*—Harry B. Tanner
(74) *Attorney, Agent, or Firm*—Westerman, Hattori, Daniels & Adrian, LLP.

(57) ABSTRACT

The present invention aims to prevent the occurrence of liquid compression at the second rotary compression element before it happens while improving the compression efficiency with an intermediate cooling circuit in a refrigerant cycle apparatus which comprises an internal high-pressure type multi-stage compression compressor, and the invention is summarized in that the apparatus comprises an intermediate cooling circuit which allows refrigerant discharged from the first rotary compression element of a compressor to dissipate heat, where a microcomputer performs control on the number of revolutions of the compressor to maintain the temperature/pressure of refrigerant so that the refrigerant does not condense at the output of the intermediate cooling circuit, where such a control is done in response to outputs from an outside-air temperature sensor, a refrigerant temperature sensor, and a signal from a controlling apparatus of a refrigerating apparatus body.

2 Claims, 3 Drawing Sheets

Figure 1:
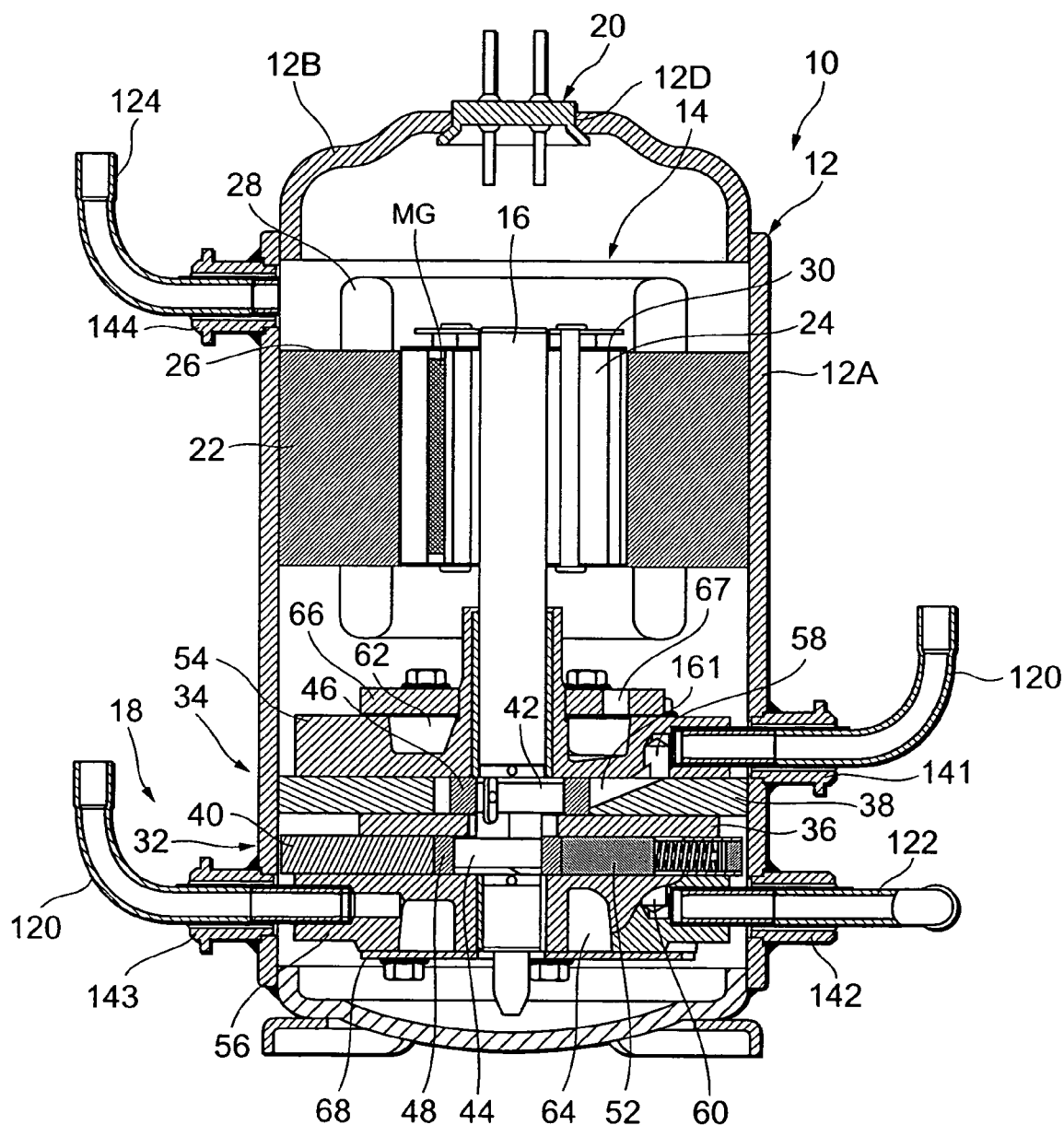

REFRIGERANT CYCLE APPARATUS

BACKGROUND OF THE INVENTION

The present invention relates to a refrigerant cycle apparatus which comprises a compressor, a gas cooler, throttling means, and an evaporator, which are sequentially connected to form a refrigerant circuit.

In a conventional refrigerant cycle apparatuses of this kind, a rotary compressor (compressor), a gas cooler, throttling means (capillary tube, etc.), and an evaporator, etc., are formed into a sequential loop through piping connection to make up a refrigerant cycle (refrigerant circuit). Refrigerant gas is taken into the low pressure chamber side of a cylinder by entering from a suction port of a rotary compression element in a rotary compressor, and it is compressed into high-pressure, high-temperature refrigerant gas through the workings of rollers and vanes, and the compressed gas is discharged from the high pressure chamber side into a gas cooler by going through a discharge port and a discharge silencing chamber. After heat dissipation at the gas cooler, the refrigerant gas is throttled by throttling means to be fed to an evaporator. As the refrigerant evaporates there, it absorbs heat from the surroundings at that time, thereby exerting a cooling effect of the conventional art (e.g., refer to Japanese Patent Publication No. 7-18602 Gazette).

However, in a case where such a refrigerant cycle apparatus adopts a type of a compressor whose pressure inside its sealed vessel tends to become high (internal high pressure), because refrigerant gas having a high temperature and a high pressure is discharged in the sealed vessel, the temperature of the compressor itself goes up, which then raises the temperature of refrigerant to be taken into a compression element of the compressor, causing a conventional problem of an reduced compression efficiency.

To deal with that problem, there has been a conventional contrivance of a refrigerant cycle apparatus which employs a multi-stage compression type compressor to perform an intermediate cooling of refrigerant under compression. That is, in addition to employing a multi-stage compression type compressor having the first and the second compression elements, such an apparatus adopts a configuration having an intermediate cooling circuit, which allows refrigerant compressed in the first compression element (the first tier) to dissipate heat, where, after heat dissipation of the refrigerant compressed in the first compression element at the intermediate cooling circuit, it is taken in the second compression element (the second tier) to be compressed there, and the compression is discharged in the sealed vessel. With such a configuration, it is possible to cool the refrigerant compressed in the first compression element, improving compression efficiency at the second compression element. In addition, the cooling of the refrigerant gas to be taken into the second compression element makes it possible to reduce the temperature rise of the refrigerant gas to be compressed in the second compression element and to be discharged in the sealed vessel, gas cooler, etc, which makes it further possible to enhance the cooling capability at the evaporator.

However, in a case where an intermediate cooling circuit is employed to cool down refrigerant compressed in the first compression element as described above, as illustrated in FIG. 4, a part of the refrigerant may be liquefied due to effects from outside-air temperature or depending on the operating conditions of a compressor, etc. Namely, there has been a conventional problem in that refrigerant may be put into a two-phase mixed state of gas/liquid (state (3) in FIG. 4), and if taken into the second compression element without any countermeasures taken, liquid compression would occur at the second compression element, suffering damage.

SUMMARY OF THE INVENTION

The present invention has been made to solve the foregoing conventional problem, and the invention aims to prevent liquid compression in the second compression element from occurring while improving compression efficiency with an intermediate cooling circuit in a refrigerant cycle apparatus comprising an internal high pressure type multi-stage compression compressor.

More specifically, in a refrigerant cycle apparatus according to the present invention, a compressor comprises the first and the second compression elements in a sealed vessel, where refrigerant compressed in and discharged from the first compression element is taken in the second compression element to be compressed therein and is discharged to a gas cooler, and in addition, the apparatus comprises an intermediate cooling circuit which allows the refrigerant discharged from the first compression element to dissipate heat, where the temperature and the pressure of the refrigerant are kept so that the refrigerant does not condense at the output of the intermediate cooling circuit, thereby preventing an undesirable suctioning of liquid refrigerant into the second compression element.

Moreover, in addition to the above-described invention, the present invention is characterized by comprising control means for controlling the number of revolutions of a compressor, where the control means functions so that the temperature and the pressure of the refrigerant are kept to prevent the refrigerant from condensing at the output of the intermediate cooling circuit.

Furthermore, in addition to the above-described invention, the present invention is characterized in that the control means controls the number of revolutions of a compressor based on the temperature of refrigerant to be suctioned into the second compression element and/or the pressure of the refrigerant to be suctioned into the second compression element.

BRIEF DESCRIPTION OF THE DRAWINGS

FIG. 1 is a vertical section diagram showing an embodiment of a rotary compressor used in a refrigerant cycle apparatus according to the present invention;

FIG. 2 is a refrigerant circuit diagram of a refrigerant cycle apparatus according to the present invention;

FIG. 3 is a p–h diagram of a refrigerant circuit according to FIG. 2; and FIG. 4 is a p–h diagram of a conventional refrigerant circuit.

DETAILED DESCRIPTION OF THE PREFERRED EMBODIMENT

Next, with reference to the attached drawings, embodiments of the present invention will be described in detail.

In each drawing, a reference numeral 10 denotes an internal high pressure type multi-stage rotary compressor which uses carbon dioxide ($CO_2$) as refrigerant, and the compressor 10 is made up of a cylinder-shaped sealed vessel 12 formed with a steel plate, an electric element 14 placed and accommodated at the upper side of an inside space of the sealed vessel 12, where the element 14 serving as a driving element, and a rotary compression mechanism section 18 composed of the first rotary compression element 32 (first stage) and the second rotary compression element 34 (second stage) driven by a rotary axis 16 of the electric element 14. With its bottom part functioning as an oil pan, the sealed vessel 12 is made up of an enclosure body 12A accommodating the electric element 14 and the rotary compression mechanism section 18, and an approximately-cup-shaped end cap (cover body) 12B which blocks the upper opening of the enclosure body 12A; a circular mounting hole 12D is formed in the upper face center of the end cap 12B, and a terminal (wiring omitted herein) 20 for providing power to the electric element 14 is fixed to the mounting hole 12.

The electric element 14 is a so-called magnetic pole concentrated winding type DC motor, which is made up of a stator 22 mounted in a loop along the internal circumference face of the upper space of the sealed vessel 12, and a rotor 24 inserted inside the stator 22 with a little clearance kept from it. The rotor 24 is fixed to the rotary axis 16 which goes through the center in a perpendicular direction. The stator 22 has a lamination body 26 which is formed by laminating doughnut-shaped electromagnetic plates, and a stator coil 28 which is coiled on the tooth of the lamination body 26 in a series winding (concentrated winding). The rotor 24 is also formed from a lamination body 30 of electromagnetic steel plates likewise the stator 22, where a permanent magnet MG is inserted in the lamination body 30.

An intermediate partition plate 36 is held in a sandwiched state between the first rotary compression element 32 and the second rotary compression element 34. Specifically, the first rotary compression element 32 and the second rotary compression element 34 are made up of the intermediate partition plate 36, an upper cylinder 38 placed on the intermediate partition plate 36 and an lower cylinder 40 placed under the plate 36, upper/lower rollers 46 and 48 which are driven to make an eccentric rotation by upper/lower eccentric sections 42 and 44 provided on the rotary axis 16 with a phase difference of 180 degrees, vanes 52 (an upper vane is not shown) which are in contact with the upper/lower rollers 46 and 48 and segments the upper cylinder 38 and the lower cylinder 40 each into a high pressure chamber side and a low pressure chamber side, and an upper support member 54 and a lower support member 56 serving as support members which block the upper opening face of the upper cylinder 38 and the lower opening face of the lower cylinder 40 and share the bearing of the rotary axis 16.

On the other hand, the upper support member 54 and the lower support member 56 are provided with suction ducts 58 and 60 connected to the internal of the upper cylinder 38 and the lower cylinder 40 respectively via suction ports 161 (a lower suction port is not shown), and the members are further provided with discharge silencing chambers 62 and 64 each formed by denting a part thereof and by blocking the dent with an upper cover 66 or a lower cover 68.

The discharge silencing chamber 62 in the second rotary compression element 34 and the inside of the sealed vessel 12 are connected to each other through a discharge hole 67, which penetrates through the upper cover 66 to provide an opening at the side of the electric element 14 in the sealed vessel 12, and high-pressure refrigerant gas compressed in the second rotary compression element 34 is discharged via the discharge hole 67 to the sealed vessel 12.

As refrigerant, considering such aspects as global environmental soundness, flammability, toxicity, etc., the above-described carbon dioxide ($CO_2$), is used, which is a natural refrigerant, whereas as lubricant oil, one of existing oils such as, for example, mineral oil, alkyl-benzene oil, ether oil, ester oil, PAG (polyalkylene glycol), etc., is used.

On the side surfaces of the enclosure body 12A of the sealed vessel 12, sleeves 141, 142, 143, and 144 are welded on positions corresponding to the suction ducts 58 and 60 in the upper support member 54 and the lower support member 56, the discharge silencing chamber 64, and the upper side (just on the electric element 14) of the stator 22, respectively. The sleeves 141 and 142 are vertically adjacent to each other, while the sleeve 143 is positioned approximately on a diagonal line of the sleeve 142. In addition, the sleeve 144 is placed above the sleeve 143. In the sleeve 141, a refrigerant injection tube 120 for injecting refrigerant gas into the upper cylinder 38 is inserted and connected thereto, with the other end of the refrigerant injection tube 120 providing a gas-way to the suction duct 58 for the upper cylinder 38. The refrigerant injection tube 120 goes to the sleeve 143 by way of a gas cooler 140 provided in an intermediate cooling circuit 135, which will be described later, with its other end inserted and connected in the sleeve 143 to provide a gas-way to the discharge silencing chamber 64 in the first rotary compression element 32.

Here, the intermediate cooling circuit 135 functions to allow refrigerant discharged from the first rotary compression element 32 to dissipate heat, where the refrigerant injection tube 120 of the intermediate cooling circuit 135 is provided in such a manner that it goes through the gas cooler 140.

In the sleeve 142, one end of a refrigerant injection tube 122 for injection of refrigerant gas into the lower cylinder 40 is inserted and connected thereto in such a manner that one end of the refrigerant injection tube provides a gas-way to the suction duct 60 of the lower cylinder 40 whereas the other end of the refrigerant injection tube 122 connected to a strainer 156. The strainer 156 functions to capture and strain foreign objects such as dust, cut particles, etc., which are mixed into refrigerant gas circulating through a refrigerant circuit, where such a strainer is configured to comprise an opening part provided on the other end of the strainer 156, and an approximately-cone-shaped filter, which is not shown in the drawing, and which tapers down from the opening part toward the one end of the strainer 156. The opening part of the filter is attached in a tight fitting to refrigerant piping 128 which is connected to the other end of the strainer 156. In the sleeve 144, a refrigerant discharge tube 124 is inserted and connected thereto, with one end of the refrigerant discharge tube 124 provides a gas-way to the inside of the sealed vessel 12 over the electric element 14.

Figure 2:
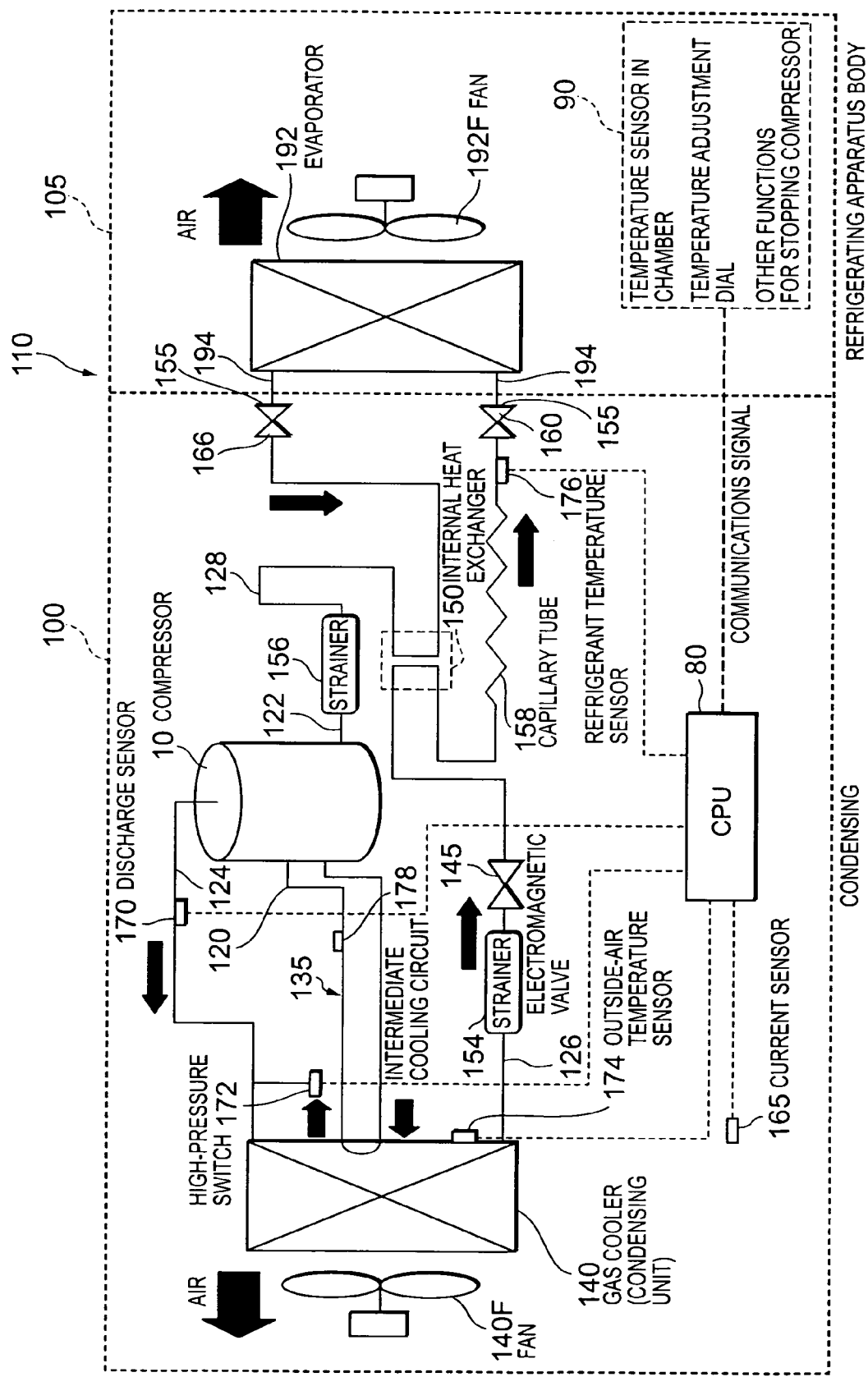

Next, in FIG. 2, the above-described compressor 10 forms a part of a refrigerant circuit in a refrigerant cycle apparatus 110 according to the present invention illustrated in FIG. 2. Here, an example of the refrigerant cycle apparatus according to the present embodiment is a show case installed at a store/shop. The refrigerant cycle apparatus 110 is made up of a condensing unit 100 and a refrigerating apparatus body 105 which serves as a cooling apparatus body. Accordingly, the refrigerating apparatus body 105 is the body of the show case.

The refrigerant discharge tube 124 in the compressor 10 is connected to the inlet of the gas cooler 140. The gas cooler 140 is provided with an outside-air temperature sensor 174 functioning as a temperature sensor for detection of the air outside, and the outside-air temperature sensor 174 is connected to a microcomputer 80 acting as a controlling apparatus for the condensing unit 100, which will be described later.

Refrigerant piping 126 connected to the outlet of the gas cooler 140 goes through a strainer 154 which is similar to one described above, and through an electromagnetic valve 145 to pass an internal heat exchanger 150. The internal heat exchanger 150 functions to exchange heat between refrigerant of high-pressure side from the second rotary compression element 34 outputted by the gas cooler 140 and refrigerant of low-pressure side outputted by the evaporator 192 provided in the refrigerant apparatus body 105. The electromagnetic valve 145 is connected to the microcomputer 80. The microcomputer 80 performs control in such a manner that, as the compressor is set in motion, it opens the electromagnetic valve 145, whereas it closes the valve 145 as the compressor 10 stops its operation.

After going through the internal heat exchanger 150, refrigerant piping 126 of the high pressure side enters a capillary tube 158, which is throttling means. Going through the capillary tube 158, the refrigerant piping 126 is connected to the inlet of a valve apparatus 160 (a high-pressure side valve apparatus). To one end of refrigerant piping 194 of the refrigerating apparatus body 105, a sewage lock coupler 155 is attached as connection means. The sewage lock coupler 155 connects the valve apparatus 160 and the one end of the refrigerant piping 194 from the refrigerating apparatus body 105 in a removable manner.

On the other hand, the refrigerant piping 128 connected to the other end of the strainer 156 goes through the internal heat exchanger 150 and then is connected to the outlet of a valve apparatus 166 (a low-pressure side valve apparatus). To the other end of the refrigerant piping 194 of the refrigerating apparatus body 105, a sewage lock coupler 155 similar to one described above is attached. The other end of the refrigerant piping 194 from the refrigerating apparatus body 105 is connected to the inlet of the valve apparatus 166 with the sewage lock coupler 155 in a removable manner.

The refrigerant discharge tube 124 is provided with a discharge sensor 170, which is for detection of the temperature of refrigerant gas discharged from the compressor 10, and a high-pressure switch 172, which is for detection of the pressure of refrigerant gas, and these are connected to the microcomputer 80.

The refrigerant piping 126 between the capillary tube 158 and the valve apparatus 160 is provided with a refrigerant temperature sensor 176, which is for detection of the temperature of refrigerant going out from the capillary tube 158, and this sensor is also connected to the aforementioned microcomputer 80. In addition, a refrigerant temperature sensor 178 for detecting the temperature of refrigerant suctioned into the second rotary compression element 32 of the compressor 10 is provided on the refrigerant injection tube 120 at the outlet of the gas cooler 140 of the intermediate cooling circuit 135, and this sensor is also connected to the microcomputer 80 likewise the above.

Incidentally, a reference numeral 140F denotes a fan for ventilation and air-cooling for the gas cooler 140, whereas a reference numeral 192F denotes a fan for circulating a cool air inside the refrigerating apparatus body 105, where such a cool air is derived from heat exchange with the evaporator 192, which is provided in a duct, not shown in the FIG., of the refrigerating apparatus body 105. Denoted by reference numeral 165 is a current sensor which detects the flowing current of the electric element 14 of the compressor 10 and controls its operation. The fan 140F and the current sensor 165 are connected to the microcomputer 80 in the condensing unit 100, while the fan 192F is connected to a controlling apparatus 90 of the refrigerating apparatus body 105, which will be described later.

Here, the microcomputer 80 is a controlling apparatus responsible for controlling the condensing unit 100, and its signal input ports are connected to the discharge sensor 170, the high-pressure switch 172, the outside-air temperature sensor 174, the refrigerant temperature sensor 176, the refrigerant temperature sensor 178, the current sensor 165, and the controlling apparatus 90 as controlling means of the refrigerating apparatus body 105. In response to outputs from these, the microprocessor 80 performs control on the compressor 10, the electromagnetic valve 145, and the fan 140F connected to its outputs. Furthermore, the microcomputer 80 performs control on the temperature/pressure of refrigerant at the output stage of the intermediate cooling circuit 135 so that the refrigerant does not condense.

More specifically, in addition to normal control on the number of revolutions of the compressor 10, the microcomputer 80 performs control on the number of revolutions of the compressor 10 to maintain temperature/pressure of refrigerant compressed in the first compression element 32 at the output of the intermediate cooling circuit 135 so that the refrigerant does not condense, where such a control is done in response to outputs from the outside-air temperature sensor 174, the refrigerant temperature sensor 178, and a transmission signal from the controlling apparatus 90 of the refrigerating apparatus body 105. This control is done by the microprocessor 80's forcibly increasing the number of revolutions of the compressor 10 by a predetermined Hz regardless of its normal control on the number of revolutions so that the temperature/pressure of the refrigerant is maintained at a temperature/pressure under which the refrigerant does not condense (the refrigerant is not converted in gas/liquid two-phase mixed state) at the intermediate cooling circuit 135, where such a forcible increase is done when the temperature detected by each of the above-described sensors drops under a preset temperature, and a predefined signal, which will be described later, is transmitted from the controlling apparatus 90 of the refrigerating apparatus body 105.

The aforementioned controlling apparatus 90 in the refrigerating apparatus body 105 is provided with the temperature sensor in a chamber for detecting the temperature in chamber, a temperature adjustment dial for adjusting the temperature in chamber, and with other functions for stopping the compressor 10. In response to these outputs, the controlling apparatus 90 controls the fan 192F, and in addition, sends out a signal to the microprocessor 80 in the condensing unit 100. That is, the controlling apparatus 90 sends an ON signal to the microcomputer 80 when the temperature sensor in the chamber of the refrigerating apparatus body 105 detected by the temperature sensor in the chamber reaches the upper limit temperature, while the apparatus 90 sends an OFF signal to the microcomputer 80 when the detected temperature reaches the lower limit temperature. Moreover, the controlling apparatus 90 sends out the aforementioned predefined signal to the microcomputer 80 when the temperature in the chamber of the refrigerating apparatus body 105 detected by the temperature sensor in the chamber drops under the preset value.

When the predefined signal is sent from the controlling apparatus to the microcomputer 80, upon the reaching of the temperature detected by the outside-air temperature sensor 174 and the refrigerant temperature sensor 178 drops under the preset setting value, the microcomputer 80 increases the number of revolutions of the compressor 10 forcibly by a predetermined Hz as described above. This keeps the temperature/pressure of refrigerant so that the refrigerant does not condense at the intermediate cooling circuit 135.

In this way, because the microcomputer 80 controls the number of revolutions of the compressor 10 in response to the outputs from the outside-air temperature sensor 174, the refrigerant temperature sensor 178, and a signal from the controlling apparatus 90 of the refrigerating apparatus body 105 in order to keep the temperature/pressure of refrigerant so that the refrigerant does not condense even when the refrigerant, which is compressed in the first rotary compression element 32 and then flown into the intermediate cooling circuit 135, is subjected to heat dissipation at the gas cooler 140, it is possible to prevent an undesirable occurrence of liquid compression caused by the condensing of the refrigerant at the intermediate cooling circuit 135 and by the suctioning of liquid refrigerant into the second compression element 34.

As refrigerant for such a refrigerant cycle apparatus 110, considering such aspects as global environmental soundness, flammability, toxicity, etc., the above-described carbon dioxide ($CO_2$), is used, which is a natural refrigerant, whereas as lubricant oil, one of existing oils such as, for example, mineral oil, alkyl-benzene oil, ether oil, ester oil, PAG (polyalkylene glycol), etc., is used.

The aforementioned refrigerating apparatus body 105 is made up of the evaporator 192 and the refrigerant piping 194 which goes through the inside of the evaporator 192. The refrigerant piping 194 snakes its way through the evaporator 192, and a fin for heat exchange is attached to the part of meandering to form the evaporator 192. Both of the ends of the refrigerant piping 194 are connected to the sewage lock couplers 155 in a removable manner.

Next, with the above configuration, the operation of the refrigerant cycle apparatus 110 is explained with reference to a p–h diagram (Moliere diagram) in FIG. 3. Upon the turning-ON of a start switch, not illustrated in the drawing, provided in the refrigerating apparatus body 105, or upon the connection of a power socket of the refrigerating apparatus body 105 to a receptacle, the microcomputer 80 opens the electromagnetic valve 145 to apply power to the stator coil 28 of the electric element 14 of the compressor 10 through the terminal 20 and wiring, which is not shown in the drawing. Energized by this, the electric element 14 starts from rest and the rotor 24 turns, and the upper/lower rollers 46 and 48 fitted to the upper/lower eccentric sections 42 and 44 which are provided with the rotary axis 16 to form an integral part make eccentric rotations inside the upper/lower cylinders 38 and 40.

Figure 3:
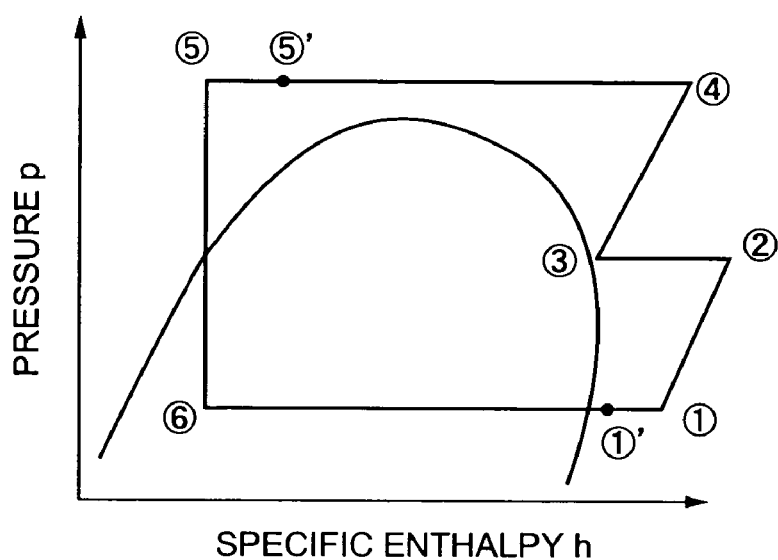

By this means, refrigerant gas in low pressure state (state (1) in FIG. 3) which is taken into the low pressure chamber side of the cylinder 40 from a suction port, not illustrated, by way of the suction duct 60 formed in the refrigerant injection tube 122 and the lower support member 56 is compressed by the operation of the roller 48 and the vane 52 into intermediate-pressure gas (state (2) in FIG. 3), and the compressed gas passes through a discharge port, not illustrated, from the high pressure chamber side, and enters the refrigerant injection tube 120 by way of the discharge silencing chamber 64 formed in the lower support member 56, and goes out through the sleeve 143 to flow into the intermediate cooling circuit 135.

Then, the refrigerant dissipates heat in the process of going through the gas cooler 140 of the intermediate cooling circuit 135 in an air-cooling scheme (state (3) in FIG. 3). As described above, because it is possible to cool the refrigerant gas at the gas cooler 140 effectively by having the refrigerant gas, compressed into an intermediate-pressure one at the first rotary compression element 32, pass through the intermediate cooling circuit 135, it is ensured that a temperature rise inside the second rotary compression element 34 and the sealed vessel 12 is suppressed, further making it possible to enhance compression efficiency at the second rotary compression element 34.

Here, the microcomputer 80 performs control on the number of revolutions of the compressor 10 to maintain temperature/pressure of refrigerant so that the refrigerant does not condense at the intermediate cooling circuit 135 in response to the temperature of the refrigerant detected by the outside-air temperature sensor 174 and by the refrigerant temperature sensor 178, and a transmission signal from the controlling apparatus 90 of the refrigerating apparatus body 105. That is, when the temperature detected by each of the above-described sensors drops under a preset setting value, and a predefined signal is transmitted from the controlling apparatus 90 of the refrigerating apparatus body 105, the microprocessor 80 increases the number of revolutions of the compressor 10 by a predetermined Hz regardless of its normal control on the number of revolutions of the compressor 10 so that the temperature/pressure of the refrigerant is maintained at a temperature/pressure under which the refrigerant does not condense at the intermediate cooling circuit 135.

Figure 4:
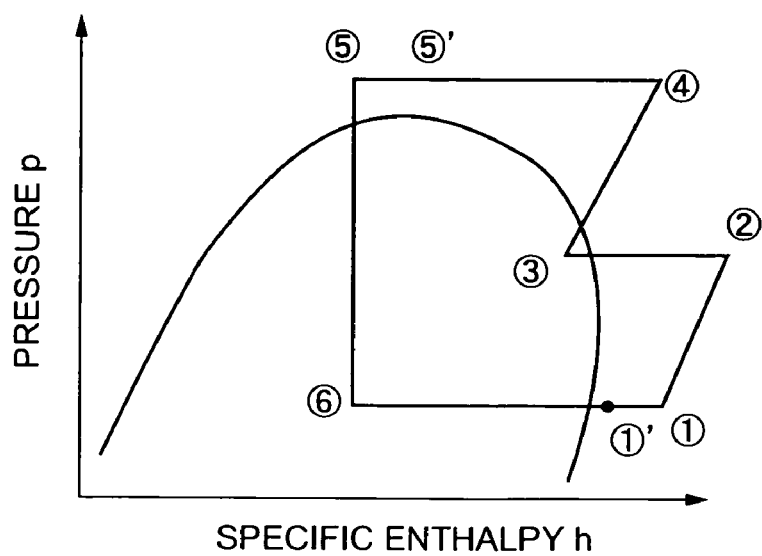

In a case where the microcomputer 80 does not control the number of revolutions of the compressor 10 as described above, if the operation were done with a small number of revolutions of the compressor 10 under conditions where the outside-air temperature, the refrigerant temperature at the intermediate cooling circuit 135, and the temperature in the chamber of the refrigerating apparatus body 105 are low, the temperature/pressure of refrigerant compressed in the first rotary compression element 32 would become low, which would cause intermediate-pressure refrigerant cooled at the gas cooler 140 to be put into a gas/liquid two-phase mixture in the process of going through the intermediate cooling circuit 135 as illustrated with (3) in FIG. 4.

If the refrigerant which is put into a gas/liquid two-phase mixture at the intermediate cooling circuit 135 in this way were suctioned into the second rotary compression element 34 of the compressor 10 just as it is, liquid compression would occur at the second rotary compression element 34 of the compression 10, and as its consequence, the compressor 10 might get damaged.

In contrast, according to the present invention, in response to outputs from the outside-air temperature sensor 174, the refrigerant temperature sensor 178, and a transmission signal from the controlling apparatus 90 of the refrigerating apparatus body 105, in a case where the temperature detected by each sensor drops under a preset value, and a predefined signal is transmitted from the controlling apparatus 90, the number of revolutions of the compressor 10 is forcibly increased by the microcomputer 80 regardless of its normal control on the number of revolutions, and accordingly, the temperature/pressure of refrigerant compressed at the first rotary compression element 32 is controlled so that the refrigerant does not condense at the gas cooler 140 of the intermediate cooling circuit 135 (state (3) in FIG. 3).

This makes it possible to prevent the occurrence of liquid compression at the second rotary compression element 34 of the compressor 10 before it happens, thereby ensuring a stable operation of the compressor 10.

Therefore, even in a case where the internal high-pressure type compressor 10 is employed, it is possible to improve the compression efficiency of the second rotary compression element 34 thanks to heat dissipation effects of the intermediate cooling circuit 135, and in addition, to prevent the occurrence of liquid compression at the second rotary compression element 34 of the compressor 10 before it happens, which makes it further possible to enhance the capabilities and reliability of the refrigerant cycle apparatus 110.

Meanwhile, intermediate-pressure refrigerant gas cooled by the intermediate cooling circuit 135 goes through the suction duct 58 which is formed in the upper support member 54 and then is suctioned from the suction port 161 into the low-pressure chamber side of the upper cylinder 38 of the second rotary compression element 34, where the suctioned gas is subjected to the second stage compression through the operation of the roller 46 and a vane, which is not shown, to be converted into a high-pressure, high-temperature refrigerant gas, and it goes from the high-pressure chamber side to pass through a discharge port, which is not shown, to go through the discharge silencing chamber 62 formed in the upper support member 54, and it is discharged from the discharge hole 67 toward the lower side of the electric element 14 in the sealed vessel 12. This discharge makes the temperature/pressure inside the sealed vessel 12 high. At this moment, the refrigerant is compressed up to an adequate ultra-critical pressure (state (4) in FIG. 3).

The refrigerant gas discharged in the sealed vessel 12 passes through the clearance of the electric element 14 to enter the refrigerant discharge tube 124 formed above the upper side of the stator 22, and goes out from the sleeve 144 to flow into the gas cooler 140. After heat dissipation in an air-cooling scheme (state (5)' in FIG. 3), the refrigerant gas goes into the refrigerant piping 126 to go through the strainer 154, the electromagnetic valve 145, to pass through the internal heat exchanger 150. The refrigerant gas is further cooled there through absorption of its heat by another low-pressure side refrigerant (state (5) in FIG. 3). This produces an effect of a further greater degree in super-cooling of the refrigerant, thereby improving the cooling capabilities of the refrigerant at the evaporator 157.

The refrigerant gas at the high-pressure side cooled by the internal heat exchanger 150 enters the capillary tube 158. It is noted that, at the inlet of the capillary tube 158, the refrigerant gas is still in an ultra-critical state. Through the reduction in the pressure of the capillary tube 158, the refrigerant is put into a gas/liquid two-phase mixture (state (6) in FIG. 3), and goes through the valve apparatus 160 and the sewage lock coupler 155 to flow from the refrigerant piping 194 of the refrigerating apparatus body 105 into the evaporator 192. As the refrigerant evaporates there, it absorbs heat from the surrounding atmosphere to exert cooling effects, cooling the inside of the refrigerating apparatus body 105.

As described above, thanks to the effects of suppressed rise in the temperature inside the second rotary compression element 34 and the sealed vessel 12, which is produced by flowing intermediate-pressure refrigerant gas compressed in the first rotary compression element 32 through the intermediate cooling circuit 135 for heat dissipation, it is possible to improve the compression efficiency at the second rotary compression element 34; and in addition to that, owing to the effects of greater degree in super-cooling of the refrigerant, produced by conducting a heat exchange with another refrigerant at the low-pressure side at the internal heat exchanger 150, it is possible to improve the cooling capabilities in the evaporator 192 of the refrigerating apparatus body 105.

Thereafter, flowing out of the evaporator 192, the refrigerant goes through the refrigerant piping 194, the sewage lock coupler 155 of the condensing unit 100, the valve apparatus 166 thereof, in that order, and goes to the internal heat exchanger 150. Absorbing heat from the aforementioned high-pressure side refrigerant there, the refrigerant is subjected to heat influence. Herein, though it is possible that the refrigerant which evaporates itself at the evaporator 192 to lower its temperature and goes out of the evaporator 192 is in a state where liquid component is mixed therein instead of pure vapor state, the refrigerant is subjected to heat application by exchanging heat with the high-pressure side refrigerant in the process of going through the internal heat exchanger 150. At this point, the degree of superheat of such a refrigerant is ensured, converting the refrigerant into pure gaseous form.

By this means, as it is ensured that refrigerant going out of the evaporator 192 is put into pure gaseous form, it is possible to prevent a "liquid back" phenomenon of suctioning liquid refrigerant into the compressor 10 without a need for providing an accumulator, etc., at the low-pressure side, thereby making it possible to avoid undesirable damages to the compressor 10 which would be otherwise cause by liquid compression. Accordingly, the reliability of the cooling apparatus 110 is improved.

Incidentally, the refrigerant subjected to heat application at the internal heat exchanger 150 repeats its cycle of going through the strainer 156 to be suctioned from the refrigerant injection tube 122 into the first rotary compression element 32 of the compressor 10.

As described above, because the microcomputer 80 performs control on the number of revolutions of the compressor 10 to maintain temperature/pressure of refrigerant at the output of the intermediate cooling circuit 135 so that the refrigerant does not condense, where such a control is done in response to outputs from the outside-air temperature sensor 174, the refrigerant temperature sensor 178, and a signal from the controlling apparatus 90 of the refrigerating apparatus body 105, the refrigerant from the first rotary compression element 32 never gets condensed at the intermediate cooling circuit 135. This helps avoid a liquid-back phenomenon of suctioning liquid refrigerant into the second rotary compression element 34.

Therefore, even in a case where an internal high-pressure type compressor is employed, it is possible to improve the compression efficiency of the second rotary compression element 34 thanks to heat dissipation effects of the intermediate cooling circuit 135, and in addition, to prevent the occurrence of liquid compression at the second rotary compression element 34 of the compressor 10 before it happens, which makes it further possible to enhance the capabilities and reliability of a refrigerant cycle apparatus.

It is noted that, though it is described in this embodiment that, in response to outputs from the outside-air temperature sensor 174, the refrigerant temperature sensor 178, and a signal from the controlling apparatus 90 of the refrigerating apparatus body 105, the microcomputer 80 performs control on the number of revolutions of the compressor 10 to maintain temperature/pressure of refrigerant at the output of the intermediate cooling circuit 135 so that the refrigerant does not condense, notwithstanding the foregoing, the present invention is not limited to such a configuration but may be alternatively configured in such a way that, for example, the volume of air supplied by the fan 140F of the gas cooler 140 may be controlled so that it does not condense, or such an amount of refrigerant that never condenses at the intermediate cooling circuit 135 may be filled in the refrigerant cycle apparatus.

In addition, in a case where the intermediate cooling circuit 135 is not provided with the refrigerant temperature sensor 178 for detection of the temperature of refrigerant to be taken into the second rotary compression element 34, it may alternatively configured in such a manner that the microcomputer 80 estimates the temperature/pressure of refrigerant at the output of the intermediate cooling circuit based on the temperature of refrigerant discharged from the compressor or the temperature of refrigerant to be suctioned into the compressor.

Moreover, another alternative configuration may be adopted in which the microcomputer 80 performs control to maintain temperature/pressure of refrigerant at the output of the intermediate cooling circuit 135 so that the refrigerant does not condense in response to outputs from a sensor other than the outside-air temperature sensor 174, the refrigerant temperature sensor 178, and the temperature sensor in the chamber of the refrigerating apparatus body 105.

Furthermore, in the explanation of the present embodiment, it is assumed that an internal high-pressure type multi-stage (two-tier) compression rotary compressor is employed as the compressor 10, however, the compressor which could be used for the present invention is not limited to such one; instead, any multi-stage compressor comprising compression elements having two stages or greater which produce internal high-pressure state may be used.

Further in addition, although carbon dioxide is assumed to be used as refrigerant according to the present embodiment, the refrigerant is not limited thereto; instead, various kinds of refrigerants such as hydrocarbon refrigerant or nitrous oxide may be alternatively used.

As described above in detail, according to a refrigerant cycle apparatus of the present invention, a compressor comprises the first and the second compression elements in a sealed vessel, where refrigerant compressed in and discharged from the first compression element is taken in the second compression element to be compressed therein and is discharged to a gas cooler, and in addition, the apparatus comprises an intermediate cooling circuit which allows the refrigerant discharged from the first compression element to dissipate heat, where the temperature and pressure of the refrigerant are kept so that the refrigerant does not condense at the output of the intermediate cooling circuit, and therefore, it is possible to keep the temperature/pressure of the refrigerant so that the refrigerant does not condense at the output of the intermediate cooling circuit, achieved by providing control means for controlling the number of revolutions of the compressor based on the temperature of the refrigerant to be suctioned into the second compression element and/or the pressure of the refrigerant to be suctioned into the second compression element.

This makes it possible to prevent the occurrence of liquid compression at the second rotary compression element of a compressor before it happens, thereby ensuring a stable operation of the compressor.

Therefore, in a refrigerant cycle apparatus comprising an internal high-pressure type multi-stage compression compressor, it becomes possible to improve the compression efficiency of the second rotary compression element thanks to heat dissipation effects of an intermediate cooling circuit, and in addition, to prevent the occurrence of liquid compression at the second rotary compression element of the compressor before it happens, which makes it further possible to enhance the capabilities and reliability of the refrigerant cycle apparatus.

What is claimed is:

1. A refrigerant cycle apparatus comprising a compressor, a gas cooler, throttling means and an evaporator which are sequentially connected to each other to form a refrigerant circuit, wherein:

the compressor includes first and second compression elements in a sealed vessel, and refrigerant compressed in and discharged from the first compression element is taken in the second compression element to be compressed therein and is discharged to the sealed vessel and subsequently to the gas cooler; and the refrigerant cycle apparatus further comprises an intermediate cooling circuit which allows the refrigerant discharged from the first compression element to dissipate heat, and the temperature and the pressure of the refrigerant are kept so that the refrigerant does not condense at the output of the intermediate cooling circuit, and control means for controlling the number of revolutions of the compressor, wherein the control means controls the number of revolutions of the compressor so that the temperature and the pressure of the refrigerant are kept to prevent the refrigerant from condensing at the output of the intermediate cooling circuit.

2. The refrigerant cycle apparatus according to claim 1, wherein, the control means controls the number of revolutions of the compressor based on the temperature of the refrigerant to be suctioned into the second compression element and/or the pressure of the refrigerant to be suctioned into the second compression element.

* * * * *